US005657196A

United States Patent [19]

[11] Patent Number: 5,657,196

[45] Date of Patent: Aug. 12, 1997

Chaudhry et al.

[54] COAXIAL TRANSMISSION LINE SURGE ARRESTOR

[75] Inventors: Nisar A. Chaudhry, West Babylon; Carl E. Meyerhoefer, Commack; Robert Cannetti, Deer Park; Thomas J. Smith, Bayshore; Carl H. Meyerhoefer, Dix Hills, all of N.Y.

[73] Assignee: TII Industries, Inc., Copiague, N.Y.

[21] Appl. No.: 548,903

[22] Filed: Oct. 26, 1995

Related U.S. Application Data

[63] Continuation-in-part of Ser. No. 351,667, Dec. 8, 1994, Pat. No. 5,566,056.

[51] Int. Cl.$^{6}$ .......... H02H 1/00

[52] U.S. Cl. .......... 361/117; 361/56; 361/91; 361/111; 361/120

[58] Field of Search .......... 361/118, 119, 361/120, 124, 127, 111, 56, 117; 439/578; 174/581, 2

[56] References Cited

U.S. PATENT DOCUMENTS

| | | | |
|---|---|---|---|
| 978,959 | 12/1910 | Thomas | 361/118 |
| 2,237,426 | 4/1941 | Grassnick et al. | 361/119 |
| 2,339,663 | 1/1944 | Teare | 175/41 |
| 2,395,991 | 3/1946 | Chilcot et al. | 361/120 |
| 2,620,453 | 12/1952 | Beese et al. | 313/185 |
| 3,140,416 | 7/1964 | Sleeper | 361/120 |
| 3,274,447 | 9/1966 | Nelson | 361/119 |
| 4,035,693 | 7/1977 | Luxa et al. | 361/120 |
| 4,051,546 | 9/1977 | Scheithauer | 361/124 |
| 4,103,291 | 7/1978 | Howe et al. | 361/120 |
| 4,275,432 | 6/1981 | Napiorkowski | 361/124 |
| 4,319,300 | 3/1982 | Napiorkowski et al. | 361/119 |
| 4,359,764 | 11/1982 | Block | 361/119 |
| 4,394,704 | 7/1983 | Jones | 361/120 |
| 4,409,637 | 10/1983 | Block | 361/120 |
| 4,437,845 | 3/1984 | Schleimann-Jensen | 445/39 |
| 4,495,539 | 1/1985 | Cook | 361/120 |
| 4,509,090 | 4/1985 | Kawanami et al. | 361/119 |
| 4,544,984 | 10/1985 | Kawanami | 361/119 |
| 4,578,733 | 3/1986 | Shigemori et al. | 361/120 |
| 4,616,155 | 10/1986 | Guichard | 313/573 |
| 4,633,359 | 12/1986 | Mickelson et al. | 361/119 |
| 4,866,562 | 9/1989 | Jones | 361/124 |
| 5,050,033 | 9/1991 | Pagliuca | 361/129 |
| 5,088,937 | 2/1992 | Gabany | 439/581 |
| 5,210,677 | 5/1993 | Smith | 361/119 |
| 5,224,012 | 6/1993 | Smith | 361/119 |
| 5,282,109 | 1/1994 | Smith | 361/119 |
| 5,384,679 | 1/1995 | Smith | 361/111 |

FOREIGN PATENT DOCUMENTS

| | | | |
|---|---|---|---|
| 28894 | 5/1914 | Belgium | H02H 9/00 |
| 3212684A1 | 10/1983 | Germany | H01R 17/12 |
| 2083945 | 3/1982 | United Kingdom | H01J 12/40 |

*Primary Examiner*—Jeffrey A. Gaffin
*Assistant Examiner*—Stephen Jackson
*Attorney, Agent, or Firm*—Morgan & Finnegan

[57] ABSTRACT

A network interface apparatus for connecting incoming and subscriber coaxial transmission lines and having a coaxial transmission line surge arrestor connected in series between the coaxial transmission lines, the surge arrestor comprising a gas discharge tube having a hollow conductive housing and a center conductor having a longitudinal axis parallel to the direction of signal transmission, the interior surface of the hollow housing and the exterior surface of the center conductor being symmetric with respect to the longitudinal axis, ratio of the inner diameter of the conductive housing to the outer diameter of the center conductor being varied within the gas discharge tube for matching the impedance of the surge arrestor to that of the transmission line.

95 Claims, 15 Drawing Sheets

COAXIAL TRANSMISSION LINE SURGE ARRESTOR

This application is a continuation in part of application Ser. No. 08/351,667 filed Dec. 8, 1994 which issued as U.S. Pat. No. 5,566,056 on Oct. 15, 1996.

BACKGROUND OF THE INVENTION

1. Field of the Invention

The present invention relates to network interface apparatus for connecting an incoming coaxial transmission line to a subscriber coaxial transmission line and protecting the coaxial transmission lines against overvoltage conditions using a coaxial gas discharge tube surge arrestor.

2. Discussion of the Relevant Art

It is known in the prior art to use a network interface apparatus to connect incoming coaxial cable television signals to a subscriber's television set using modules with coaxial connectors ("coax modules") and to include in the apparatus individual telephone subscriber line modules for connecting telephone company and subscriber telephone lines. See, for example, U.S. Pat. No. 5,394,466 issued to Schneider et al. on Feb. 28, 1995. See also Square D Company brochure 1220BR9202R3/92, which also discloses that the coax modules are grounded by being screwed to a metal plate which is connected to earth ground at the time of installation. However, the known coaxial network interface apparatus do not provide a coaxial transmission line surge arrestor to protect the coaxial transmission lines from overvoltage conditions. Nor do they provide overvoltage protection for the telephone company and subscriber lines.

Gas discharge tubes suitable for use with conventional telephone lines are shown in Napiorkowski U.S. Pat. No. 4,212,047 issued on Jul. 8, 1980. However, such surge arrestors are unsuitable for coaxial transmission lines which have unique characteristics and requirements. Several attempts have, however, been made to provide gas discharge tube surge arrestors for coaxial transmission lines.

Kawanami U.S. Pat. No. 4,544,984 issued Oct. 1, 1985 (Kawanami '984) discloses a gas discharge tube surge arrestor for a coaxial transmission line. According to the Kawanami '984 patent, conventional gas discharge tubes, while suitable as surge arrestors for telephone lines, cannot be used for high frequency coaxial transmission lines because (1) the gas discharge tube has a considerable amount of capacitance and (2) the nature of the required connection is such that it greatly changes the impedance of the coaxial transmission line and causes reflections in the transmission line. According to the Kawanami '984 patent, there has previously been no surge arrestor which could be used in a high frequency coaxial transmission line (column 1, line 57 to column 2, line 4).

The Kawanami '984 patent discloses a surge arrestor which connects a gas discharge tube between the inner and outer conductors of the coaxial transmission line in a direction orthogonal to the direction of signal transmission. The unwanted increased capacitance associated with the use of a gas discharge tube in a coaxial transmission line is compensated for by reducing the effective cross sectional area of the inner conductor at the place where the gas tube contacts the inner conductor by cutting out a portion of the center conductor to create a flat area on which the gas tube rests.

Kawanami U.S. Pat. No. 4,509,090 issued on Apr. 2, 1985 (Kawanami '090) also explains why conventional gas discharge tubes have not been successfully employed as surge arrestors in coaxial transmission lines and discloses the same type of structure disclosed in the Kawanami '984 patent, i.e., a device which connects the gas discharge tube between the inner and outer conductors of the coaxial transmission line in a direction orthogonal to the direction of signal transmission. In FIG. 7 the Kawanami '090 patent provides information concerning the impact of reducing the effective cross sectional area of the center conductor at the place where it contacts the gas discharge tube, showing that small dimensional changes on the order of 1 or 2 millimeters have a significant effect on the voltage standing wave ratio (VSWR).

Mickelson U.S. Pat. No. 4,633,359 issued on Dec. 30, 1986 also discloses a surge arrestor for a coaxial transmission line in which a gas discharge tube is connected between the inner and outer conductors of the transmission line in a direction orthogonal to the direction of signal transmission. The asserted advantage of the Mickelson device is that it is "simpler and less expensive to fabricate." Like the Kawanami '090 and '984 patents, Mickelson uses a center conductor which is flattened at the place where the gas tube contacts the center conductor. In addition to serving as a seat for the gas tube, this flat area adjusts the inductance of the center conductor to compensate for the distributed capacitance of the gas tube. Chamfers are provided adjacent the flat area to match the impedance of the surge arrestor to that of the transmission line. It is well known that maximum power transfer occurs when matched impedances are employed.

Cook GB 2,083,945A discloses a coaxial transmission line gas discharge tube surge arrestor comprising a center electrode 7, a cylindrical outer electrode 1 and insulating ends 3 and 5. The center conductor can be "cranked" as shown in FIG. 2. A similar coaxial transmission line surge arrestor is shown in DE 3,212,684A1.

The present invention provides a new and improved gas discharge tube surge arrestor for coaxial transmission lines comprising a cylindrical conductive housing, an axial center conductor and insulating end caps, the ratio of the inner diameter of the conductive housing to the outer diameter of the center conductor being varied within the surge arrestor to match the impedance of the surge arrestor to that of the coaxial transmission line. The coaxial surge arrestor of the present invention is sufficiently small that it can be incorporated within or made an integral part of existing coaxial connectors. Further, the present invention results in a much simpler, easier to manufacture and, therefore, less expensive device. At the same time, the present invention permits compensating for the unwanted capacitance introduced by the presence of a gas discharge tube in the coaxial transmission line and further permits matching the impedance of the surge arrestor to that of the coaxial transmission line so as to provide a device having a useful frequency range extending from 50 MHz to at least 1 GHz.

Therefore, it is an object of the present invention to provide a network interface apparatus with a coaxial surge arrestor which has a characteristic impedance similar to that of the coaxial transmission line.

It is another object of the present invention to provide a network interface apparatus with a coaxial surge arrestor which permits compensating for the unwanted capacitance introduced by the use of a gas discharge tube in a coaxial transmission line.

It is another object of the present invention to provide a network interface apparatus with a coaxial surge arrestor which may be mounted within conventional coaxial cable components and which may be readily installed in existing coaxial transmission lines.

It is another object of the present invention to provide a network interface apparatus with a coaxial surge arrestor which includes fail safe protection so that overheating of the gas discharge tube will short the center conductor to ground, thereby protecting the equipment to which it is connected.

It is still another object of the present invention to provide a network interface apparatus with a coaxial surge arrestor which includes current limiting and/or low voltage protection.

It is another object of the invention to provide a network interface apparatus which splits the incoming coaxial transmission line into two or more subscriber coaxial transmission lines and provide a coaxial surge arrestor for the incoming and subscriber lines.

It is another object of the invention to provide a network interface apparatus with a coaxial surge arrestor, a module for interconnecting telephone company and subscriber lines and overvoltage protection for the telephone lines.

SUMMARY OF THE INVENTION

The network interface apparatus with coaxial transmission line surge arrestor according to the principles of the present invention comprises a housing and apparatus for connecting an incoming coaxial transmission line with one or more subscriber coaxial transmission lines and providing overvoltage protection for the coaxial transmission line by means of a coaxial transmission line surge arrestor in the form of a gas discharge tube. The network interface apparatus may also include apparatus for connecting a telephone company line with a subscriber line and, if so, may also include a surge arrestor for providing overvoltage protection and/or overcurrent protection for the telephone lines.

The coaxial transmission line surge arrestor comprises a hollow conductive housing having insulating ends which seal the housing and maintain an inert gas within the housing. A center conductor extends axially through the conductive housing in the direction of signal transmission. The insulating ends may be ceramic and the portions of the ceramic ends contacting the conductive housing and the central conductor may be metallized. At least a portion of the inner surface of the conductive housing and at least a portion of the outer surface the center conductor may be roughened and enlarged to concentrate the electric fields and provide reliable operation of the gas discharge tube. Matching the impedance of the coaxial surge arrestor to that of the coaxial transmission line may be effected by varying the ratio of the inner diameter of the conductive housing to the outer diameter of the center conductor along the length of the center conductor and by varying the length of the active gas discharge region of the device. The gas discharge tube may be fitted with a fail-safe mechanism employing a thermally sensitive electrical insulation which results in grounding of the coaxial transmission line if the gas discharge tube overheats during the course of its protective operation. In addition, the coaxial surge arrestor of the present invention may incorporate current limiting and/or low voltage protection.

The subject matter which we regard as our invention is particularly pointed out in the claims at the end of the specification. Our invention, including its method of operation and its numerous advantages, may best be understood by reference to the following description taken in connection with the accompanying drawings wherein like reference characters refer to like components.

BRIEF DESCRIPTION OF THE DRAWING

In order that the invention may be more fully understood, it will now be described, by way of non-limiting examples, with reference to the accompanying drawings, in which.

DESCRIPTION OF THE PREFERRED EMBODIMENTS

Figure 1:
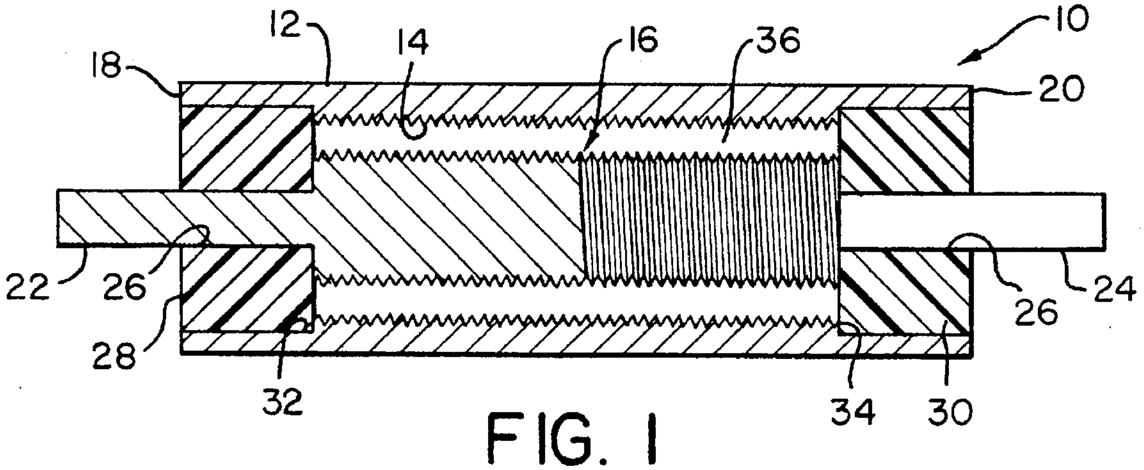
FIG. 1 is a cross-sectional view taken along the longitudinal axis of one embodiment of a gas discharge tube according to the principles of the present invention.
Figure 2:
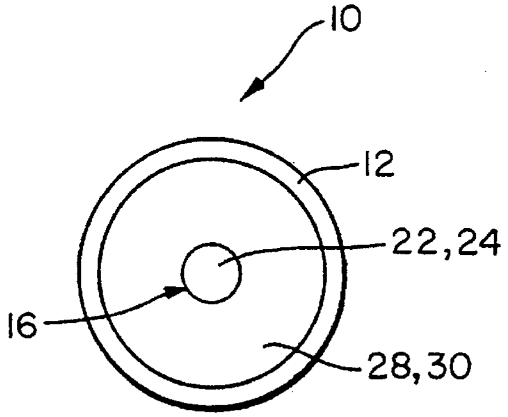
FIG. 2 is an end view in elevation of the device shown in FIG. 1.

Referring now to FIGS. 1 and 2, there is shown a gas discharge tube 10, according to the principles of the present invention, which has an elongated hollow enclosure 12 that is cylindrically shaped and made of electrically conductive material. The inner circumferential wall 14 is preferably roughened for more reliable performance, as shown by the thread-like serrations in FIG. 1, which concentrate the electric field in the discharge gap. An elongated electrically conductive electrode 16 extends from one end 18 to the other end 20 of enclosure 12.

Electrode 16 is provided with outwardly extending portions 22 and 24 which extend beyond the ends 18 and 20 of the enclosure 12 and are centrally disposed within apertures 26 provided in ceramic (nonconducting) sealing members 28 and 30 inserted in the ends 18 and 20 of the enclosure 12. Ledges 32 and 34 are provided proximate the ends 18 and 20 within the enclosure 12 so that the sealing members 28 and 30 may be accurately seated therein. The electrode 16 is also roughened along its outer circumference, as shown by the serrations in FIG. 1, in order to provide reliable firing of the gas discharge tube. Once the pieces of the gas discharge tube described above are assembled, the unit is fired in a conventional manner to allow a complete sealing of the gas 36 within the enclosure 12. The gas 36 utilized is inert and typical of that used in conventional overvoltage breakover tubes.

Figure 3:
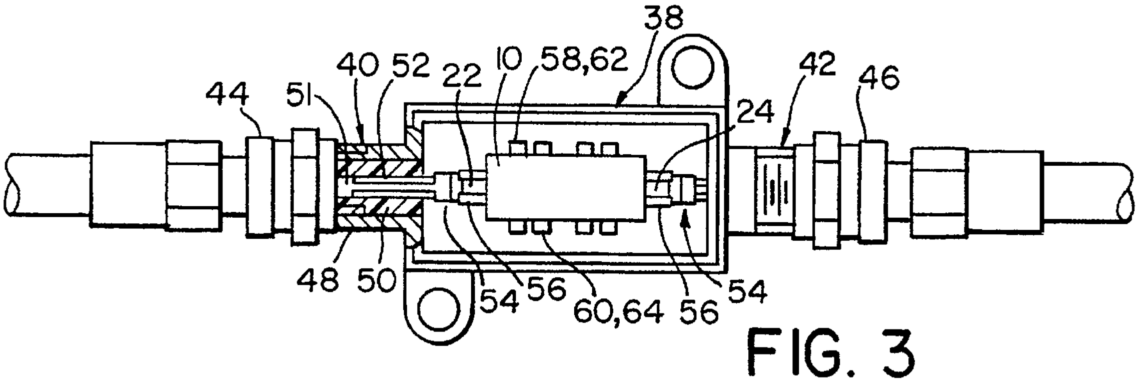
FIG. 3 is a top plan view with the cover removed, partially broken away, of a gas discharge tube inserted within a housing having a pair of coaxial connectors affixed thereto.
Figure 4:
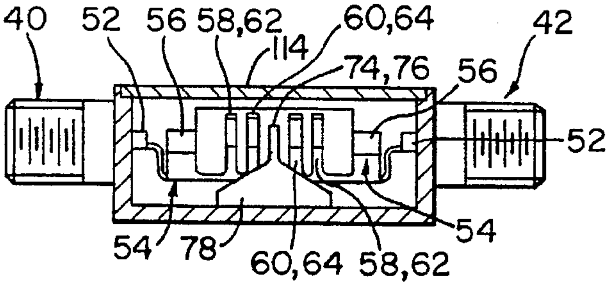
FIG. 4 is a side view in elevation, partially broken away, of the housing shown with the gas discharge tube disposed therein.

FIG. 3 shows a conductive housing 38 into which is placed the gas discharge tube 10 in a manner which will be explained hereinafter. Housing 38 includes threaded input and output connectors 40 and 42 which are adapted to receive conventional threaded F-type coaxial connectors 44 and 46, although other conventional coaxial connectors such as BNC connectors may be employed. The coaxial connectors are aligned in the direction of transmission. Each male connector includes a threaded outer shell 48 and an insulating portion 50 having a centrally disposed conductor 51 that is inserted into receptacle portion 52 of clip 54 shown in more detail in FIG. 6.

Clip 54 has a second receptacle portion 56 adapted to receive and removably hold therein the extending portions 22 and 24 of gas discharge tube 10. Clip 54 also has a plurality of fingers 58, 60, 62 and 64, which are curved and adapted to receive gas discharge tube 10 therein.

In order to insure the isolation of the conducting electrode 16 of gas discharge tube 10 so that it is not in electrically conductive contact with the clip 54, a thermally sensitive material 66 such as FEP is placed between the base portion 68 of clip 54 so that it extends over the fingers 58, 60, 62 and 64 to prevent electrically conductive contact with the metallic enclosure 12 of gas discharge tube 10.

Figure 5:
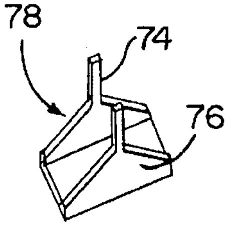
FIG. 5 is a perspective view of a ground clip.
Figure 7:
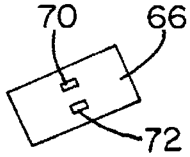
FIG. 7 is a perspective pictorial representation of the thermally sensitive insulation utilized between the gas discharge tube and the mounting clips.

FIG. 7 discloses the configuration of the FEP insulator 66. Two apertures 70 and 72 are provided in insulator 66 so that the fingers 74 and 76 of ground clip 78 (shown in FIG. 5) may come into electrically conductive contact with the metallic electrically conductive surface of the enclosure 12. Ground clip 78 is affixed to the conductive housing 38 in a conventional manner and thus, is in electrically conductive contact therewith and with the ground portion of connectors 40 and 42 and also, the connectors 44 and 46 affixed thereon completing the ground integrity of the system.

Figure 8:
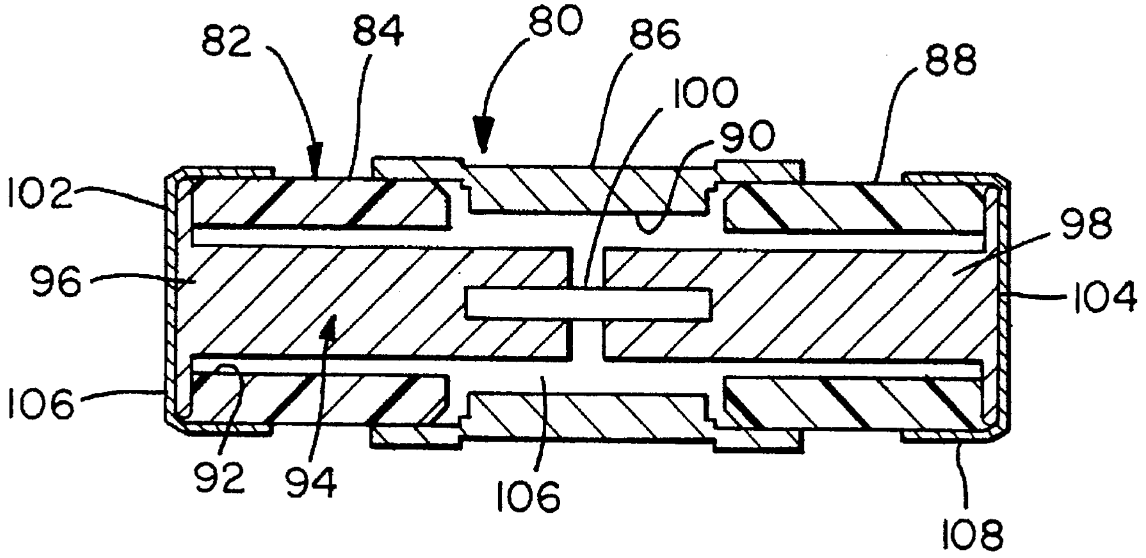
FIG. 8 is a cross-sectional view in elevation of an alternate embodiment of the gas discharge tube according to the principles of the invention.
Figure 9:
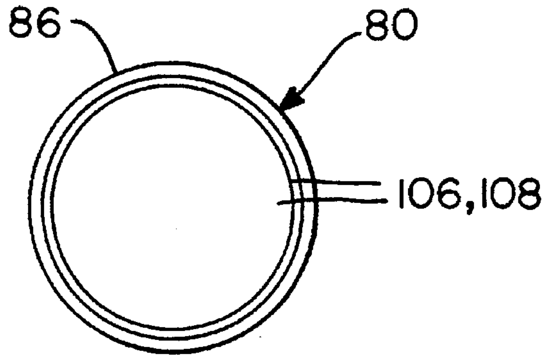
FIG. 9 is an end view in elevation of the device shown in FIG. 8.

FIGS. 8 and 9 show an alternative embodiment of the gas discharge tube 80, which includes an elongated hollow enclosure 82 that preferably is fabricated in three separate pieces. The enclosure 82 includes a first portion 84 preferably fabricated from an insulating material (ceramic), a second central electrically conductive portion 86, generally referred to as the ground terminal, and a third portion 88, which is identical to the first portion 84. Each of the three pieces is generally tubular shaped and hollow. The inner surface 90 of the conductive portion 86 may also be roughened in order to achieve more reliable performance of the gas discharge tube in a manner similar to that set forth with regard to FIG. 1.

Centrally located within the hollow opening 92 of the enclosure 82 is electrically conductive electrode 94 which is fabricated in three sections. The first and third sections 96 and 98 have the same structure and are connected together by an electrically conductive bridging pin 100 which forms the third section. Thus, electrically conductive contact is continuous from the first end 102 to the other end 104, via the bridging pin 100. End caps 106 and 108 provide the seal so that the gas 106 may be retained in the space provided between the electrically conductive electrode 94 and the enclosure 82. The end caps 106 and 108 are in electrically conductive contact with the conductive electrode 94, thus providing a continuous conducting medium from one end to the other, maintaining a continuous path therethrough.

Figure 6:
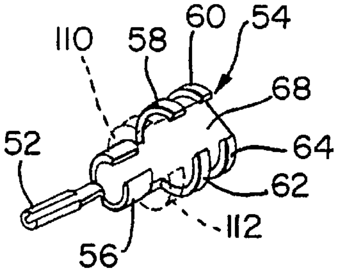
FIG. 6 is a perspective view of a mounting clip used to hold the gas discharge tube within the housing.
Figure 10:
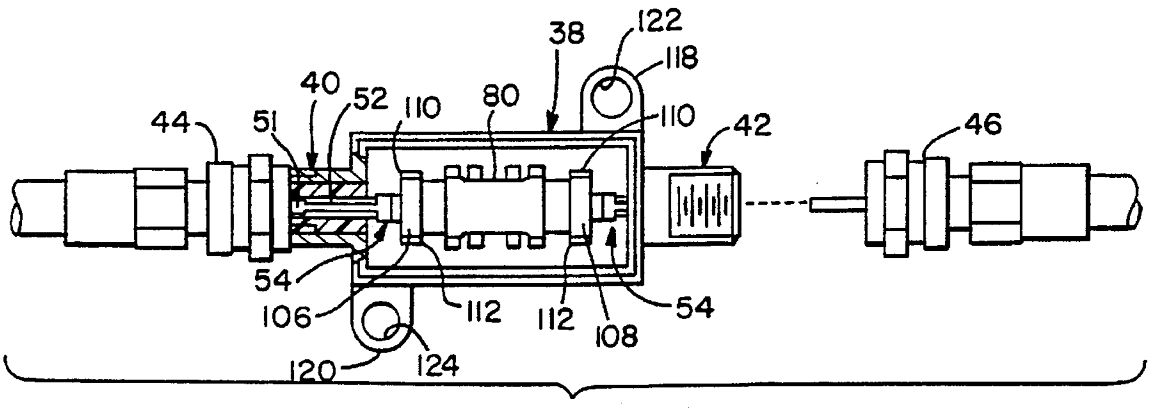
FIG. 10 is a top plan view with the cover removed, partially broken away, of the gas discharge tube as shown in FIG. 8, mounted in the housing.

FIG. 10 is a top plan view of the housing 38 having the alternative embodiment of the gas discharge tube 80 inserted therein and with one of the coaxial connectors 46 removed from the connector 42 on the housing 38. The other connector 44 is connected to the female connector 40 on the housing 38. The clip 54 shown in FIG. 6 is modified somewhat by replacing receptacle portion 56 with a pair of fingers 110 and 112 suitable for grasping the end caps 106 and 108 of the gas discharge tube 80. The remaining portion of clip 54 remains the same. Hereagain, an insulator 66 formed from a thermally sensitive material such as FEP is utilized to electrically insulate the end caps 106 and 108 from the electrically conductive material from which the clip 54 is fabricated.

Figure 11:
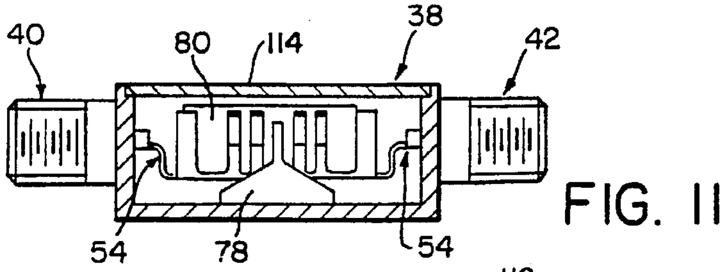
FIG. 11 is a pictorial representation, partially broken away, of the apparatus shown in FIG. 10.

FIG. 11 is a side view in elevation of the housing 38 partially in cross-section with the cover 114 in place to completely seal the housing 38. The ground clip 78 in FIG. 11 is identical to the ground clip 78 in FIG. 5.

Figure 12:
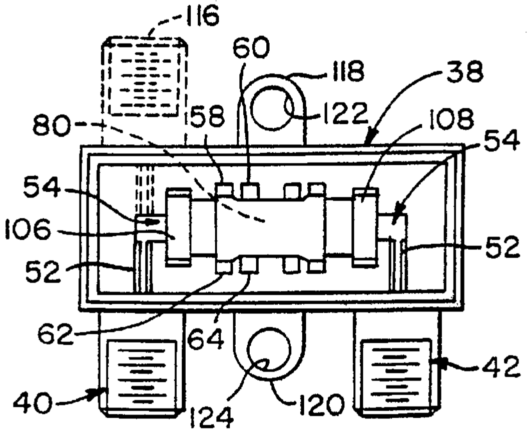
FIG. 12 is a top plan view with the cover removed of an alternative housing apparatus with the connectors appearing on different surfaces of the housing.
Figure 13:
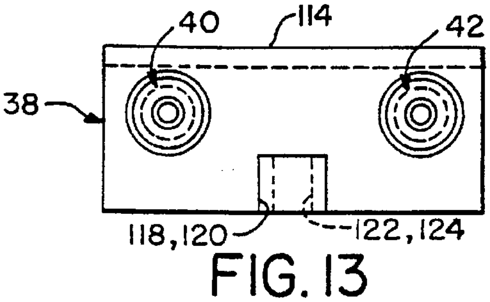
FIG. 13 is an end view in elevation of the housing apparatus shown in FIG. 12.

The surge arrestor shown in FIGS. 12 and 13 may utilize either gas discharge tube 10 or gas discharge tube 80, with the clip 54 being slightly modified from that shown in FIG. 6, since the receptacle portion 52 of clip 54 is bent at right angles so that it may accommodate female connectors 40 and 42 appearing on the same surface of the housing 38. Alternatively, a connector 116 may be placed on the opposite wall of the housing 38 for convenience, if desired, with the clip 54 being modified as necessary and shown in the broken lines. Mounting ears 118 and 120 with apertures 122 and 124 may be provided on the housing 38 to allow for mounting the housing 38 in various locations.

In operation, the parts of the gas discharge tube may be assembled and fired in a conventional manner sealing the gas within the enclosure. Thereafter, the assembly is placed in the housing utilizing the FEP insulator, mounting and ground clips so that the unit is ready for use in the field.

Figure 14:
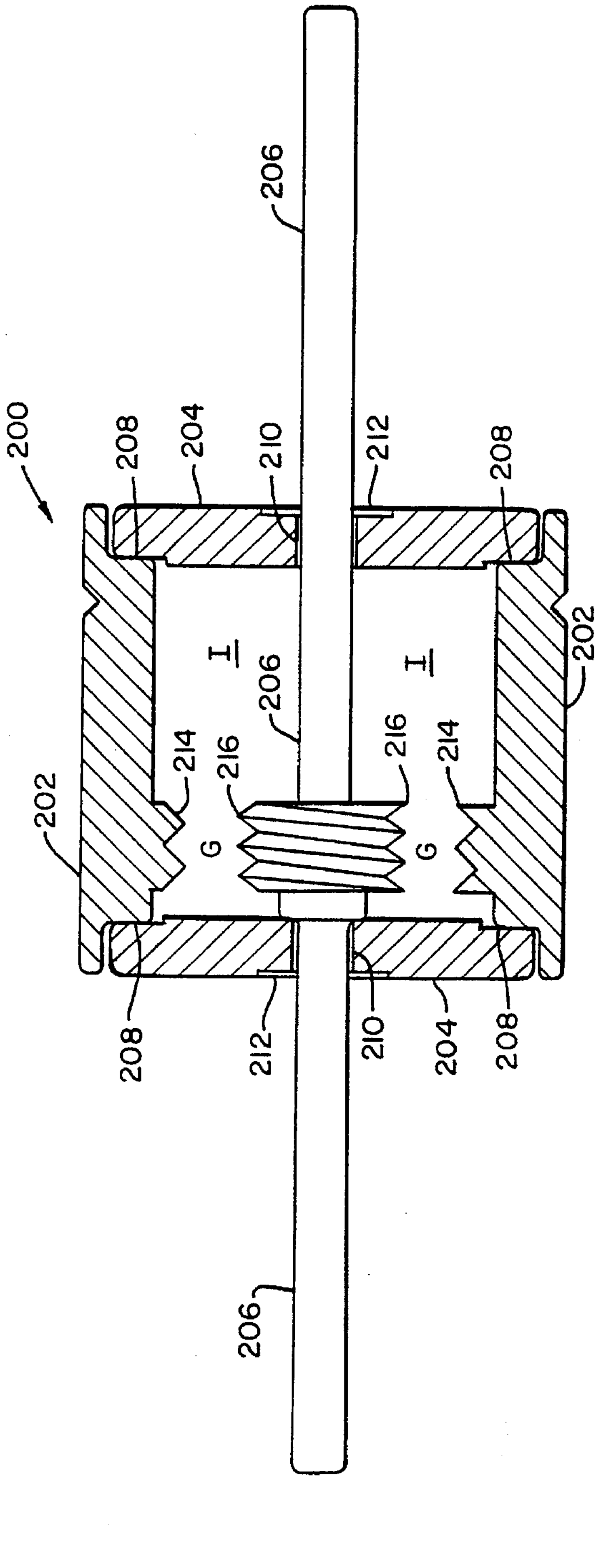
FIG. 14 is a cross-sectional view of another alternate embodiment of the gas discharge tube of the present invention.

FIG. 14 discloses another alternative embodiment of the gas discharge tube of the present invention which is suitable for use in a coaxial transmission line surge arrestor. The gas discharge tube 200 comprises a conductive housing 202, insulating ends 204 and a center conductor 206 extending through housing 202. The RF signal flows axially through the gas discharge tube 200. Although shown projecting beyond ends 204, center conductor 206 could terminate at ends 204 and external conductors could be attached thereto. As with the embodiment shown in FIG. 1, the insulating ends 204 are preferably formed from a ceramic material and seal the housing and an inert gas within the housing. In conventional gas discharge tubes the inert gas is a mixture of hydrogen and argon to provide a breakdown voltage of 250 to 350 volts DC. In a preferred embodiment of the present invention the inert gas is a mixture of neon and argon which provides a breakdown voltage of about 100 volts DC.

The insulating ends 204 are preferably metallized in the regions 208.where the ends contact the conductive housing 202. The insulating ends 204 are also preferably metallized in the regions 210 where the ends contact center conductor 206. It is also preferred that the insulating ends have annular recesses 212 in the exterior faces 205 thereof in the regions where conductor 206 projects through ends 204. These annular recesses are also preferably metallized.

The annular recesses facilitate the metallization step in the manufacturing operation. Thus, the entire outer surface of the insulating end 204 containing the annular recess can be metallized and the metallization can be removed in the area outside the annular recess by grinding down the outer surface of the insulating end.

As shown in FIG. 14, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, as with conventional gas discharge tubes, the surfaces 214 and 216 are preferably coated with a low work function material to reduce the breakdown voltage and enhance the firing characteristics of the gas discharge tube. The gas discharge occurs in the region "G" between surfaces 214 and 216. Region "G" is the active discharge region.

In addition to coating surfaces 214 and 216, it is preferable to employ "striping" in the form of radial or circular graphite lines on the interior surface of the insulating end 204 adjacent the active discharge region "G." This "striping" helps to initiate the voltage breakdown for fast rising surges.

As also shown in FIG. 14, the distance between the inner surface of the cylindrical conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2:1, 2.5:1, 3:1, 3.5:1, 4:1, 4.5:1, 5:1, 5.5:1, 6:1 or more between the insulating ends 204. For example, the ratio D/d may be 2:1 in the region "G" and 7:1 in the region "I" so that the ratio D/d varies by 7:1/2:1 or 3.5:1 between the insulating ends 204. This variation in the ratio D/d is used to adjust the impedance of the gas discharge tube to better match the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 14, the medium is an inert gas which has a dielectric constant of approximately one. Therefore, the impedance of the gas discharge tube varies between the insulating ends as the logarithm of the ratio D/d. As noted earlier, the insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G".

In addition to adjusting the ratio D/d Within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ratio of the region "G" to the region "I" may be on the order of one to two.

Some typical dimensions for the miniature coaxial transmission line gas discharge tube 200 shown in FIG. 14 are: (1) overall length of center conductor 206—approximately one inch; (2) length of conductive housing 202—approximately 0.32 inches; (3) outer diameter of gas discharge tube 200—approximately 0.33 inches; (4) outer diameter of center conductor 206 in the region "I"—approximately 0.035 inches; (5) outer diameter of the center conductor 206 in the region "G"—approximately 0.112 inches; (6) inner diameter of conductive housing 202 in the region "I"—approximately 0.23 inches; and (7) inner diameter of the conductive housing 202 in the region "G"—approximately 0.186 inches.

Thus, for these typical dimensions, the ratio D/d in the region "G" is 0.186/0.112 or 1.66:1, while the ratio D/d in the region I is 0.23/0.035 or 6:57:1. Therefore, the ratio D/d varies by 6.57/1.66 or 3.95:1 between the insulating ends 204.

Figure 15A:
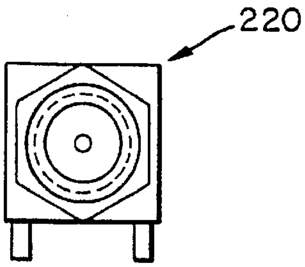
FIG. 15A is an end view of a printed circuit board coaxial connector embodying the gas discharge tube of the present invention.
Figure 15B:
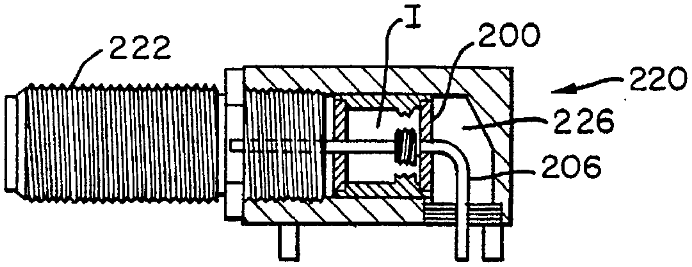
FIGS. 15B and 15C are cross-sectional views of two variations of the coaxial connector of FIG. 15A.
Figure 15C:
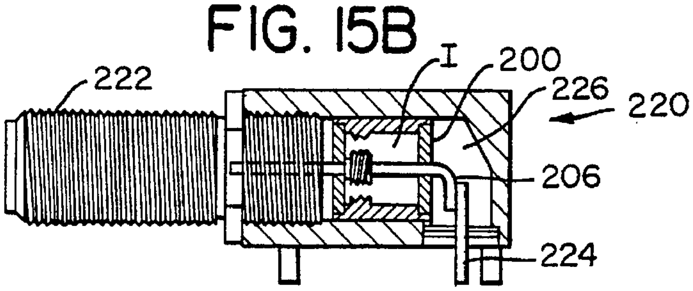

FIGS. 15A through 15C show a coaxial surge arrestor 220 which incorporates the gas discharge tube 200 of FIG. 14. Surge arrestor 220 is designed to connect between a coaxial transmission line using F-type coaxial connectors and a printed circuit board. Thus, one end 222 of surge arrestor 220 is threaded and is designed to receive a conventional male F-type coaxial connector, while the other ends has conductors projecting therefrom and is designed to be mounted on a printed circuit board or similar substrate.

In FIG. 15B the impedance matching section "T" of gas discharge tube 200 is located to the left of the gas discharge gap "G", whereas in FIG. 15C the impedance matching section "T" is located to the right of the gas discharge gap "G". In FIG. 15C the distance by which the center conductor 206 projects beyond the insulating end of gas discharge tube 200 may not be sufficient to permit connecting the surge arrestor to the printed circuit board, in which event an additional conductor 224 is employed which is electrically connected to center conductor 206.

As also shown in FIGS. 15B and 15C, the surge arrestor 220 has a cavity 226 located behind the gas discharge tube 200. This cavity can also be used for matching the impedance of the surge arrestor to that of the coaxial transmission line by appropriately dimensioning the cavity 226 and/or by filling the cavity with a material having a suitable dielectric constant.

Figure 16A:
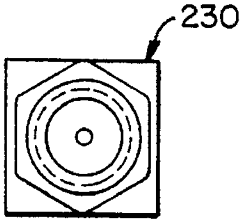
FIG. 16A is an end view of an in-line coaxial connector embodying the gas discharge tube of the present invention.
Figure 16B:
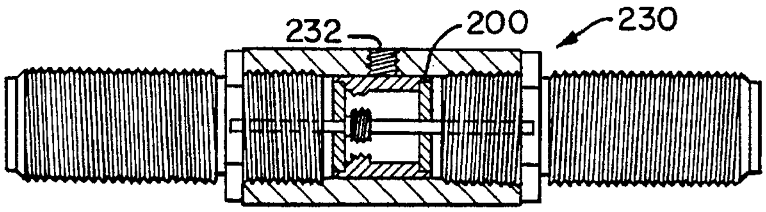
FIG. 16B is a cross-sectional view of the coaxial connector of FIG. 16A.

FIGS. 16A and 16B show another coaxial transmission line surge arrestor 230 which incorporates the gas discharge tube 200 of FIG. 14. The surge arrestor of FIGS. 16A and 16B is an in-line device designed to be connected between two coaxial transmission lines having male F-type coaxial connectors. The gas discharge tube 200 is secured within surge arrestor 230 by means of a set screw 232.

Figure 17A:
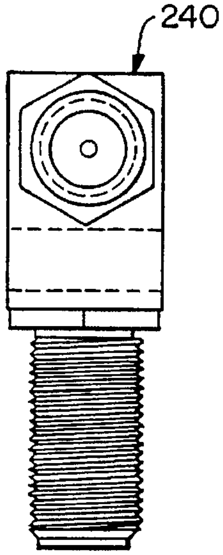
FIG. 17A is an end view of a right angle coaxial connector embodying the gas discharge tube of the present invention.
Figure 17B:
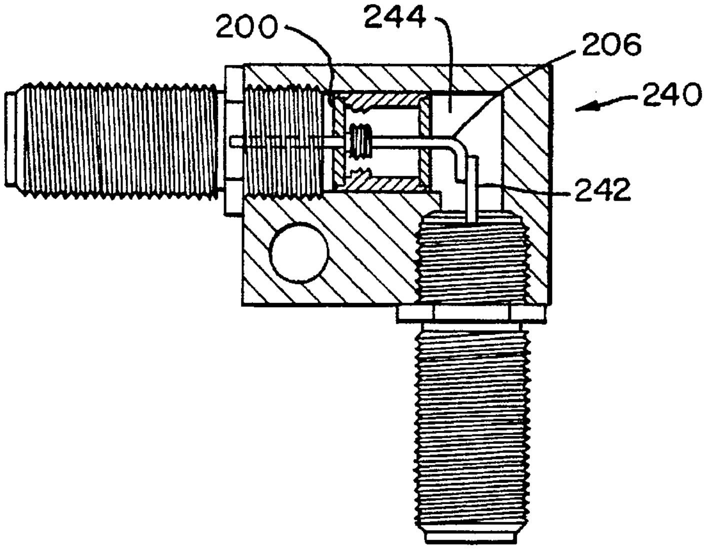
FIG. 17B is a cross-sectional view of the coaxial connector of FIG. 17A.

FIGS. 17A and 17B show another coaxial transmission line surge arrestor 240 which incorporates the gas discharge tube 200 shown in FIG. 14. The surge arrestor of FIGS. 17A and 17B is a right angle device designed to be connected between two coaxial transmission lines having male F-type coaxial connectors. As shown in FIG. 17B, the length of the center conductor 206 projecting from gas discharge tube 200 is insufficient and, therefore, it has been extended by electrically connecting a second center conductor 242 thereto. Surge arrestor 240 also has a cavity 206 which may be suitably dimensioned and/or filled with a dielectric material for matching the impedance of surge arrestor 240 to that of the coaxial transmission line.

Figure 18:
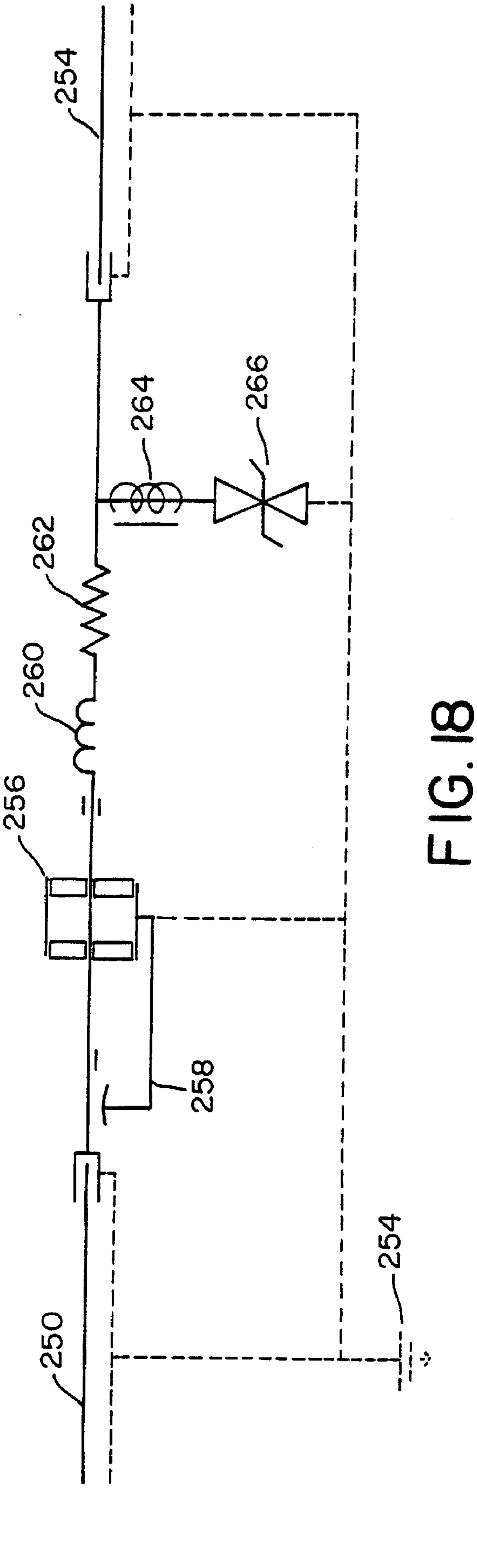
FIG. 18 is a schematic diagram of a coaxial surge arrestor in accordance with the present invention including current limiting and low voltage protection.

FIG. 18 is a schematic diagram of a coaxial transmission line surge arrestor system in accordance with the present invention. FIG. 18 shows an RF transmission line having an input 250, an output 252 and a ground 254. Located in series in the RF transmission line is a gas discharge tube 256 in accordance with the present invention. As can be seen from FIG. 18, the RF signal flows through the gas discharge tube 256 which may be any embodiment of the present invention including, without limitation, the embodiments 10, 80 and 200 shown, respectively, in FIGS. 1, 8 and 14.

The schematic diagram of FIG. 18 shows the presence of a fail short protective device at 258 which may utilize a ground clip and FEP film as previously disclosed. Also Shown is an inductor 260 and a resistor 262 for limiting the current which flows to the output 254 of the surge arrestor. In addition, a ferrite bead 264 and an avalanche diode 266 are connected between the center conductor and ground for low voltage protection. The ferrite bead 264 permits low frequency (e.g. 10 MHz and below) signals to go to ground but prevents high frequency (e.g. 50 MHz to 1 GHz) signals from going to ground. Avalanche diode 266 clamps low frequency signals to a voltage of, for example, five to ten volts.

Figure 19:
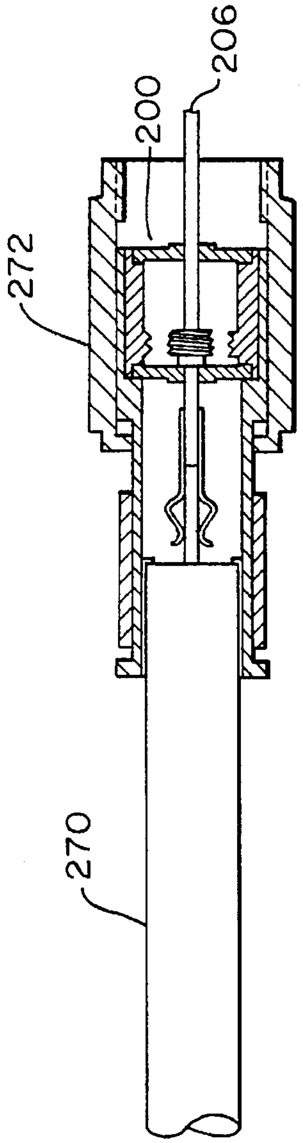
FIG. 19 is a cross-sectional view of a coaxial cable with a male coaxial connector incorporating the gas discharge tube of the present invention.

FIG. 19 shows another embodiment of the invention comprising a coaxial cable 270 having a male coaxial connector 272 attached thereto. Connector 272 contains gas discharge tube 200. The center conductor 206 of the gas discharge tube projects from the end of the male connector 272. The various parts of gas discharge tube 200 are as shown in FIG. 14 and described earlier.

Figure 20:
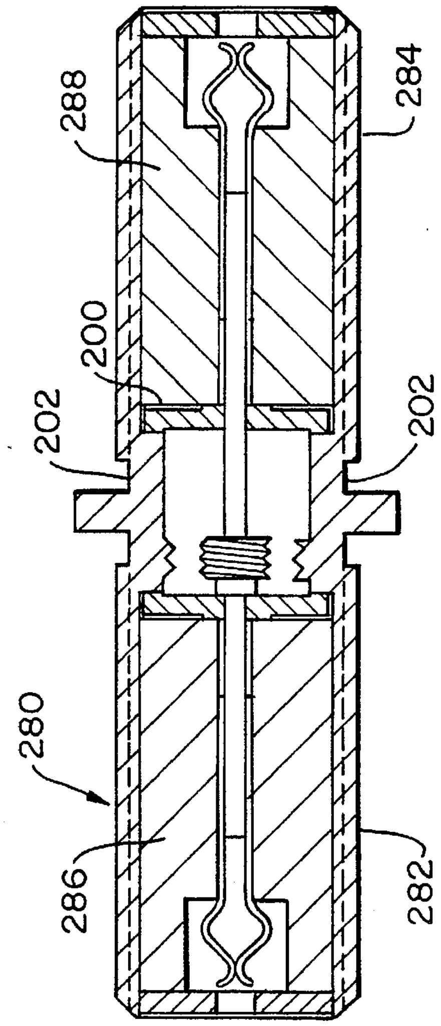
FIG. 20 is a cross-sectional view of a female—female coaxial connector having an integral surge arrestor.

FIG. 20 shows another embodiment of the invention which comprises a surge arrestor 280 having back-to-back female coaxial connectors 282 and 284. A gas discharge tube 200 is located between coaxial connectors 282 and 284. The embodiment shown in FIG. 20 differs from the embodiments shown in FIGS. 15B, 15C, 16B, 17B and 19 in that the conductive housing 202 is an integral part of the conductive outer body of the coaxial surge arrestor. As also shown in FIG. 20, the female coaxial connectors 282 and 284 have solid dielectric materials 286 and 288 located on either side of the gas discharge tube 200 which positions the gas discharge tube in the middle of the coaxial surge arrestor 280.

Figure 21:
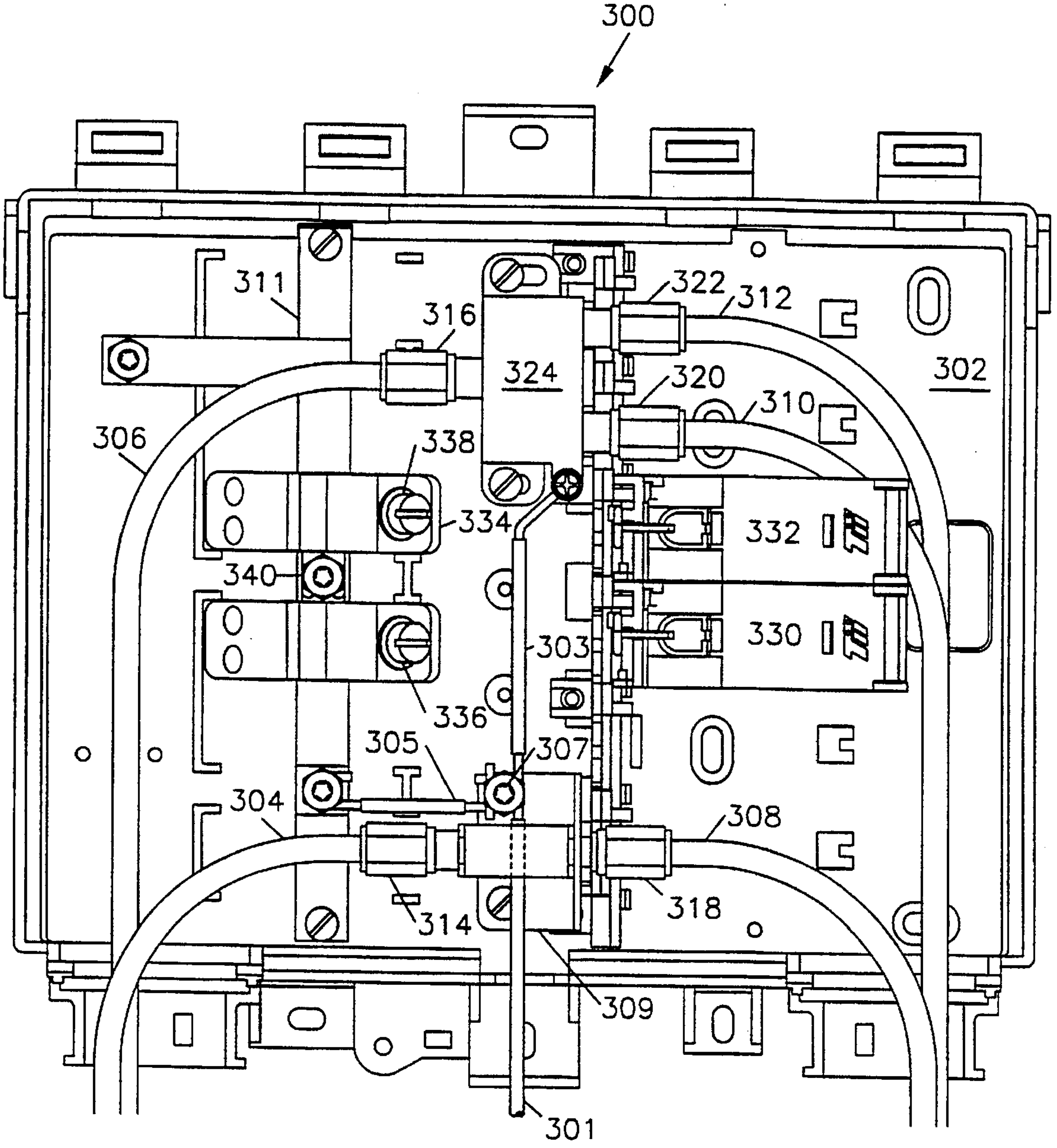
FIG. 21 is a plan view of a network interface apparatus according to the present invention which includes apparatus for terminating coaxial transmission lines and apparatus for terminating conventional telephone lines while providing overvoltage protection for both.
Figure 22:
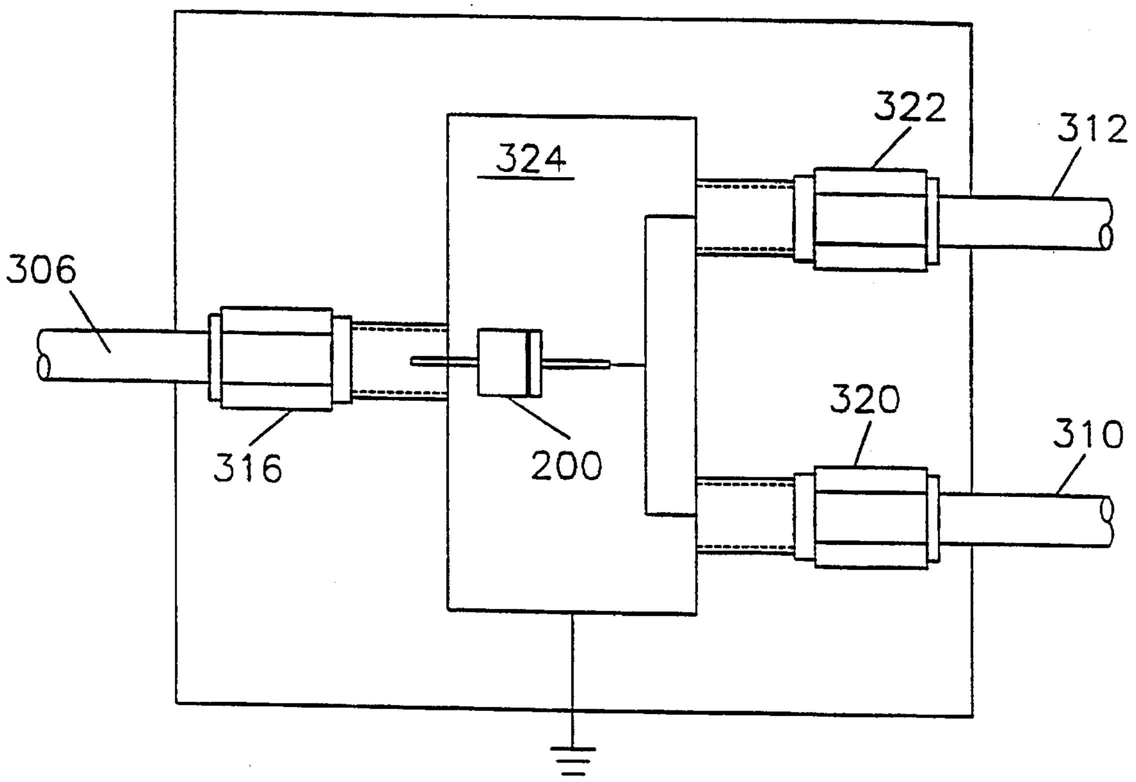
FIG. 22 is a partial schematic diagram of a coaxial transmission line splitter with a coaxial transmission line surge arrestor for use in a network interface apparatus.

FIG. 21 shows a network interface apparatus 300 comprising a housing 302 which has a cover (not shown) to protect the contents of the housing from the elements. There are two incoming coaxial transmission lines, 304 and 306, and three subscriber coaxial transmission lines, 308, 310 and 312. The five coaxial transmission lines have coaxial connectors 314, 316, 318, 320 and 322. Located between coaxial connectors 314 and 318 is a coaxial transmission line surge arrestor which is preferably of the type shown in FIG. 14. The coaxial transmission line surge arrestor is connected in series between the center conductors of the incoming and subscriber coaxial transmission lines. Located between coaxial connector 316 and coaxial connectors 320 and 322 is a splitter module 324 which splits the incoming coaxial transmission line into two subscriber coaxial transmission lines. Located within module 324 is a coaxial transmission line surge arrestor which is preferably of the type shown in FIG. 14. FIG. 22 is a partial schematic diagram of the splitter arrangement showing the coaxial transmission line surge arrestor 200 of FIG. 14.

As shown in FIG. 21, housing 302 also contains modules 330 and 332 for connecting telephone company lines with subscriber lines. The telephone company lines and subscriber lines are copper wires rather than coaxial transmission lines. Suitable modules are shown in U.S. patent application Ser. No. 08/245,974 filed May 19, 1994 in the name of Carl H. Meyerhoefer et al. and assigned to TII Industries, Inc. and in U.S. Pat. No. 4,979,209 issued to Thomas J. Collins et al on Dec. 18, 1990, the disclosure of which is incorporated herein by reference. Also mounted in housing 302 is an overvoltage protection device 334 which may contain a gas discharge tube of the type shown in Napiorkowski U.S. Pat. No. 4,212,047 issued Jul. 8, 1980. Device 334 has screw terminals 336, 338 for connection to the telephone company line and ground terminal 340. The overvoltage protection device protects the subscriber lines in the event of an overvoltage condition on the telephone company lines.

Grounding in the network interface apparatus 300 is described below. An earth ground 301 is brought into the enclosure at the time of installation. The earth ground is connected to coax ground 303 and voice ground 305 at binding post 307. This also provides the grounding for coax connectors 314 and 318 which are mounted on metal flange 309. The coax ground 303 is connected to coax splitter module 324, while the voice ground 305 is connected to voice ground strap 311 to which ground terminal 340 of overvoltage protection device 334 is connected. As shown in FIG. 21, the coax ground 303 is connected directly to earth ground 301 at the time of installation which eliminates the need for a separate ground bus such as ground bus 71 shown in FIG. 1 of Schneider et al U.S. Pat. No. 5,394,466. The elimination of the ground bus for grounding coax module 324 simplifies the construction of enclosure 300, reduces costs and provides for a more flexible arrangement of the components within enclosure 302.

Figure 23:
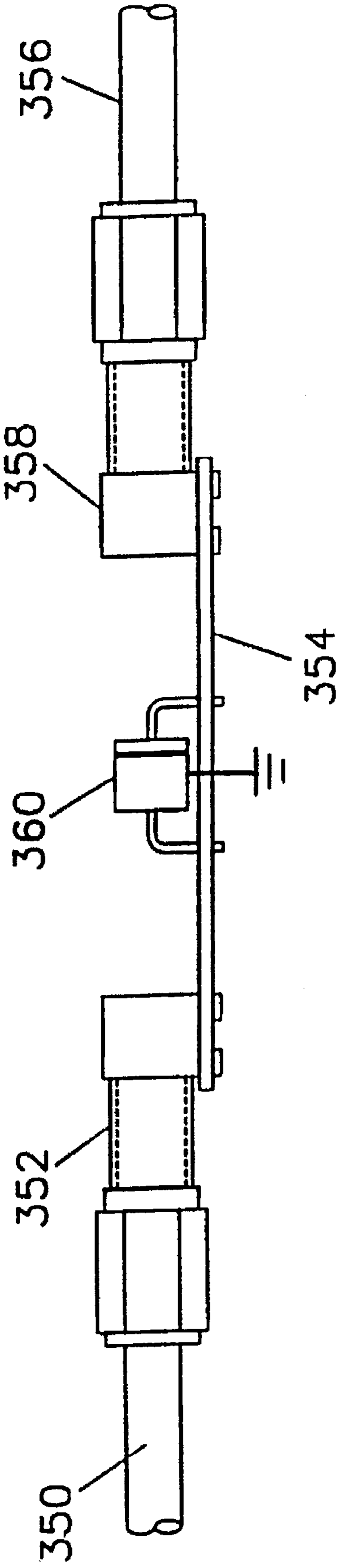
FIG. 23 is a side view of apparatus for terminating coaxial transmission lines within a network interface apparatus using a coaxial transmission line surge arrestor and coaxial connectors mounted on a printed circuit board.

FIG. 23 shows an alternative apparatus for connecting incoming and subscriber coaxial transmission lines. An incoming coaxial transmission line 350 is connected to a right angle coaxial connector 352 which is mounted on printed circuit board 354. Subscriber coaxial transmission line 356 is connected to another right angle coaxial connector 358, which is also mounted on printed circuit board 354. Connected in series between the center conductors of the incoming and subscriber coaxial transmission lines is a coaxial transmission line surge arrestor 360, which is preferably of the type shown in FIG. 14. The printed circuit board with the coaxial connector and coaxial transmission line surge arrestor is suitably mounted in housing 302. The coaxial connectors and the coaxial transmission line surge arrestor are connected to ground bus 303.

Figure 24:
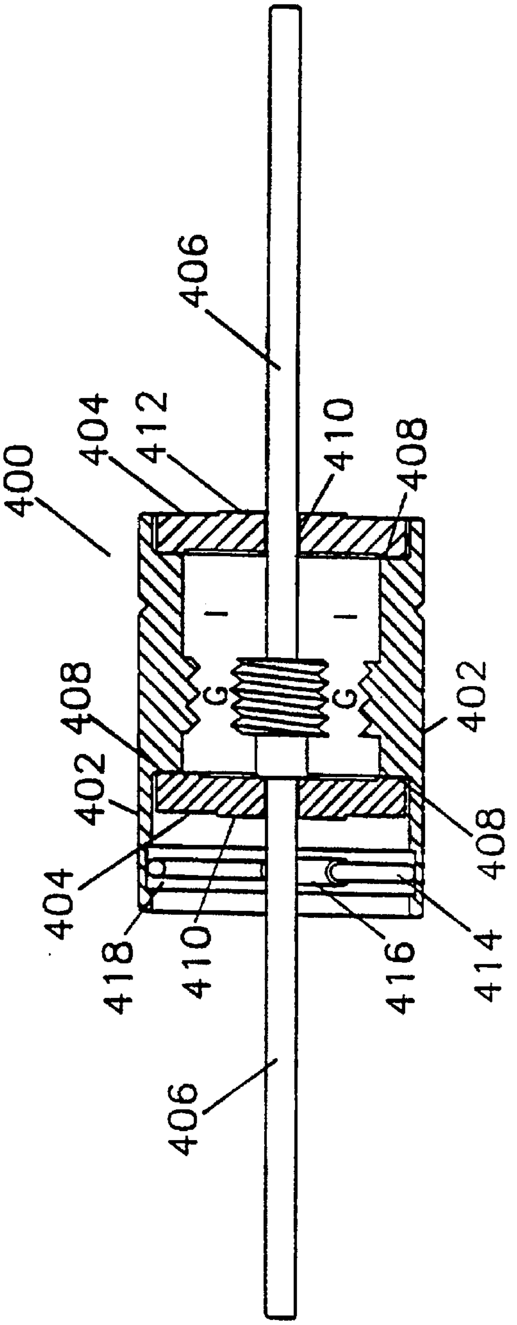
FIG. 24 is a cross sectional view of another alternate embodiment of the gas discharge tube of the present invention with fail short protection.
Figure 25:
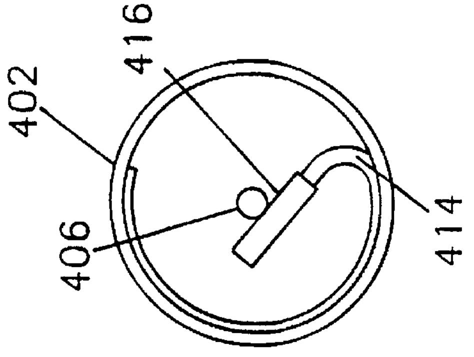
FIG. 25 is an end view of the embodiment depicted in FIG. 24.

FIGS. 24 and 25 show another embodiment of the coaxial transmission line gas discharge tube of the present invention which includes fail short protection. The gas discharge tube 400 comprises a conductive housing 402, insulating ends 404 and a center conductor 406 extending axially through the interior of the housing 402. The RF signal flows axially through the gas discharge tube 400. The insulating ends 404 are preferably formed from a ceramic material and seal the housing and an inert gas within the housing. The insulating ends 404 are preferably metallized in the regions 408 where the ends 404 contact the housing 402. The insulating ends 204 are also preferably metallized in the regions 410 and 412 where the ends 404 contact the center conductor 406. The regions 408 and 412 of ends 404 are preferably raised relative to the remainder of the ends to facilitate the metallizing process.

As shown in FIG. 24, a portion of the interior surface of conductive housing 402 and a portion of the exterior surface of the center conductor 406 are preferably toughened, for example by threads or serrations, to concentrate the electric field and increase the reliability of the gas discharge tube operation. In addition, as with conventional gas discharge tubes, the toughened surfaces are preferably coated with a low work function material to reduce the breakdown voltage and enhance the firing characteristics of the gas discharge tube. The gas discharge occurs in the region "G" between roughened surfaces. The region "G" is the active discharge region.

In addition to coating the roughened surfaces with a low work function material, it is preferable to employ "striping" in the form of radial graphite lines on the interior surfaces of the insulating end 404 adjacent the active discharge region "G. This "striping" helps to initiate the voltage breakdown.

As also shown in FIG. 24, the distance between the inner surface of the cylindrical conductive housing 402 and the outer surface of the center conductor 406 varies along the length of the center conductor between the insulating ends. This variation may take the same form as explained earlier in connection with FIG. 14.

As shown in FIGS. 24 and 25, the gas discharge tube 400 has a fail short mechanism comprising conductor 414 and insulator 416 which covers at least a portion of conductor 414. Conductor 414 is in electrical contact with conductive housing 402, while insulator 416 contacts center conductor 406 and normally prevents electrical contact between conductor 414 and conductor 406. Alternatively, insulator 416 could be located on center conductor 406. As another alternative, conductor 414 could be in conductive contact with center conductor 406 and insulated from housing 402. As a further alternative, insulator 416 could cover all of conductor 414. Insulator 416 is made from a heat sensitive material such as a thermoplastic material and is preferably made from a polyester material such as Mylar or from FEP. If the gas discharge tube overheats, insulator 416 will melt and short conductor 406 to housing 402. In operation housing 402 is connected to ground. As shown in FIG. 25, conductor 414 is preferably arcuate in shape and preferably rests within an annular recess 418 in housing 402.

Figure 26:
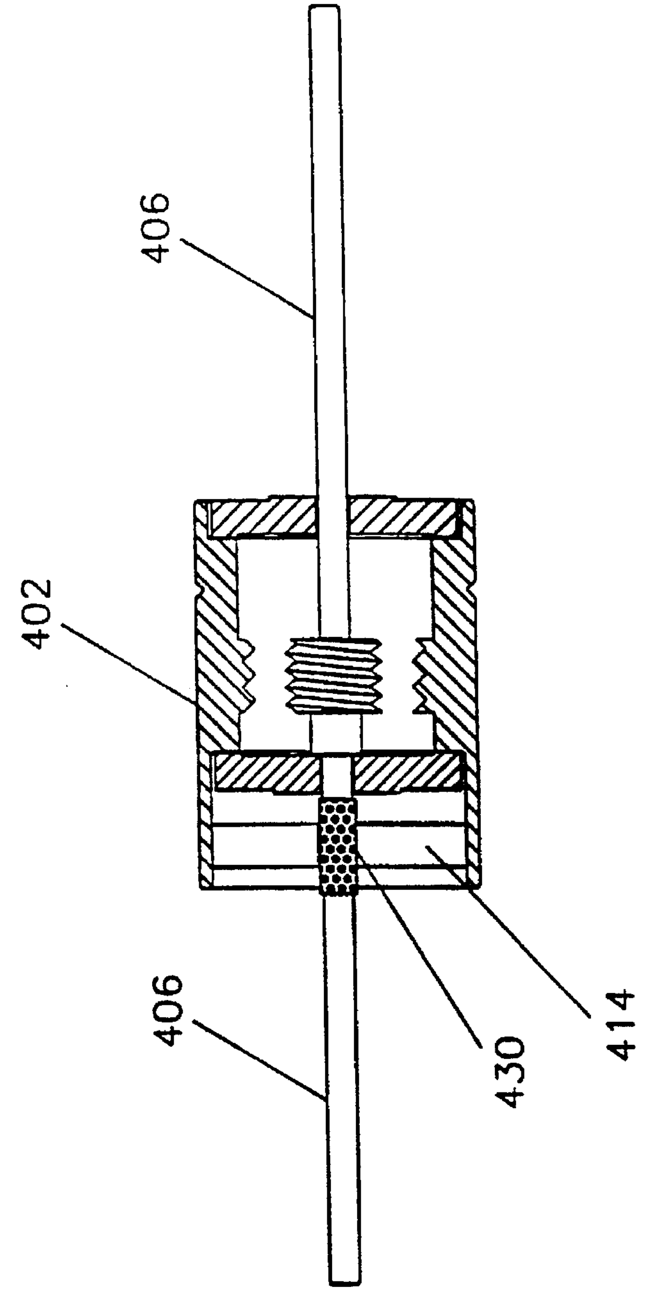
FIG. 26 is a cross sectional view of another embodiment of the gas discharge tube of the present invention with both fail short protection and a backup airgap.
Figure 27:
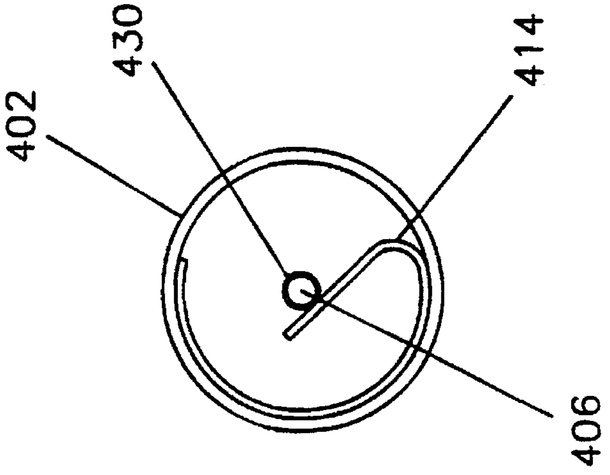
FIG. 27 is an end view of the embodiment of FIG. 26.

FIG. 26 shows a gas discharge tube similar to that shown in FIG. 24. The device shown in FIG. 26 differs from that shown in FIG. 24 in that the device shown in FIG. 26 includes both a fail short mechanism and a backup airgap in the form of a perforated heat sensitive insulating sleeve 430 surrounding the portion of center conductor 406 which contacts conductor 414. When the voltage between conductor 406 and housing 402 exceeds a predetermined level, there is a discharge between conductor 414 and conductor 406 through the airgap formed by the holes in insulating sleeve 430. The perforated sleeve 430 may be made from a heat sensitive material such as a thermoplastic material and is preferably made from a polyester material such as Mylar or from FEP. FIG. 27 is an end view of the device shown in FIG. 26 and shows the relationship among housing 402, conductor 414, conductor 406 and perforated insulating sleeve 430.

Figure 28:
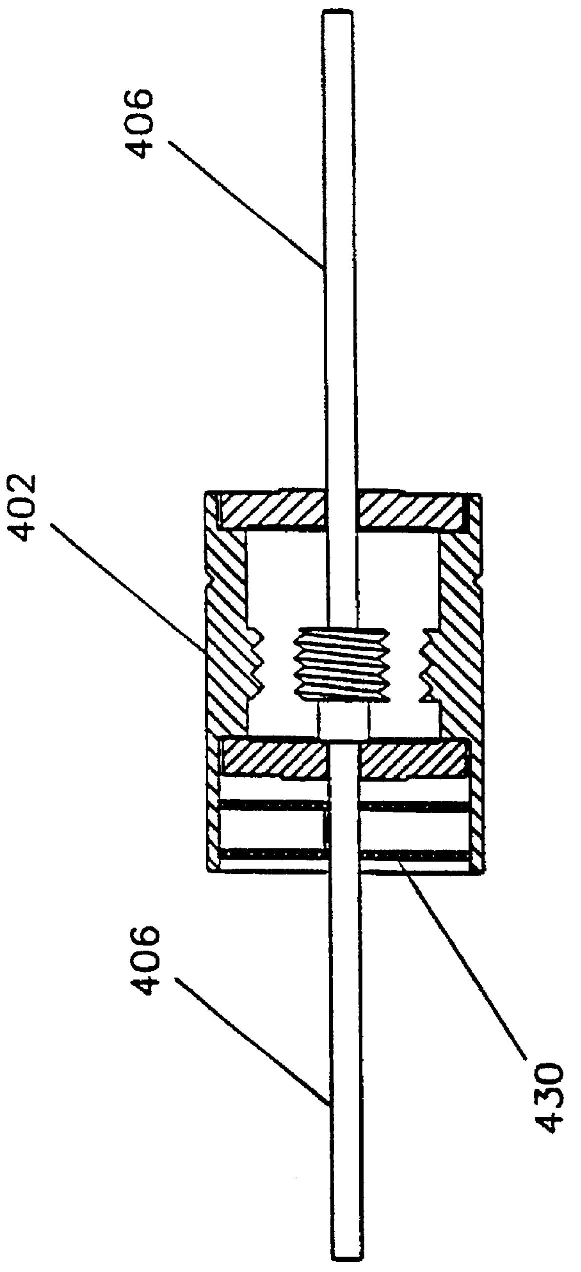
FIG. 28 is a cross sectional view of a further embodiment of the gas discharge tube of the present invention with both fail short protection and a backup airgap.
Figure 29:
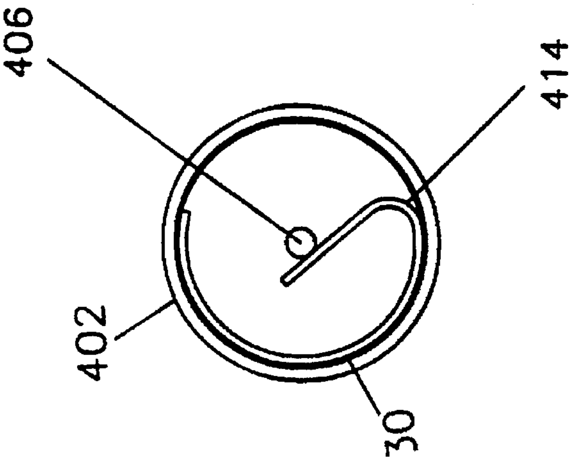
FIG. 29 is an end view of the embodiment of FIG. 28.

FIG. 28 shows a gas discharge tube similar to that shown in FIG. 26 in that both devices include both a fail short mechanism and a backup airgap. In FIG. 28 the perforated insulating material 430 is annular in shape and is located inside housing 402. It insulates conductor 414 from housing 402. Conductor 414 is in electrical contact with conductor 406. In the event of an overvoltage condition, a discharge can occur between conductor 414 and housing 422 through the holes in perforated insulator 430. FIG. 29 is an end view of the device shown in FIG. 28 and shows the relationship among housing 402, perforated insulator 430, conductor 414 and conductor 406.

Figure 30:
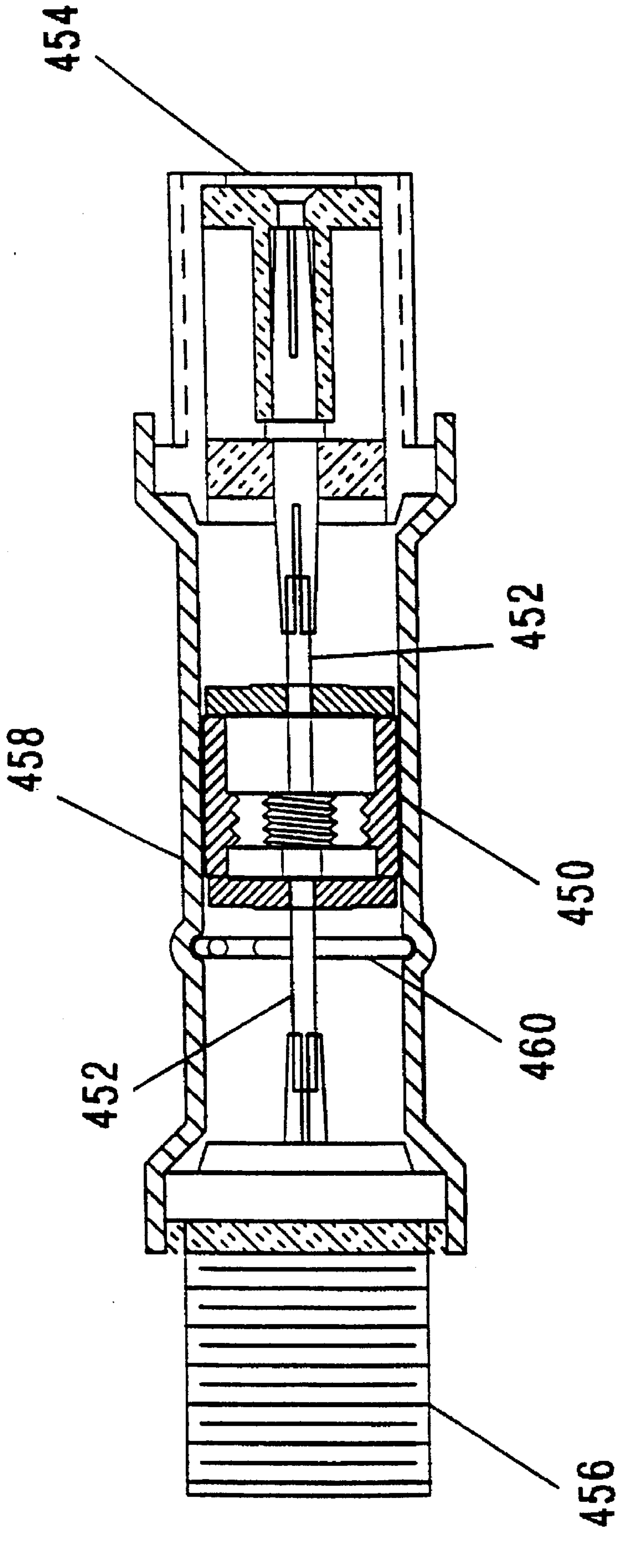
FIG. 30 is a cross sectional view of a coaxial connector embodying the gas discharge tube of the present invention with fail short protection.

FIG. 30 discloses a gas discharge tube 450 of the type disclosed in FIG. 14. Tube 450 has a center electrode 452 extending axially through the tube. The center electrode engages a female coaxial conductor 454 at one end and a male coaxial connector 456 at the other end. Surrounding gas discharge tube 450 is a conductive sleeve 458 which is in contact with the conductive housing of the gas discharge tube. Coaxial connectors 454 and 456 are mounted in sleeve 458. Also mounted in sleeve 450 is a fail short device 460 which preferably has the same construction as the fail short device comprising conductor 414 and thermally sensitive insulator 416 shown in FIG. 25. As with the fail short device shown in FIG. 25, the fail short device shown in FIG. 26 (1) may have the thermally sensitive insulator on the center conductor, (2) may have the thermally sensitive insulator extend over the entire length of the arcuate conductor or (3) may have the arcuate conductor in electrical contact with the center conductor and insulated from sleeve 458. As shown in FIG. 30, fail short device 460 is preferably mounted in an annular recess in sleeve 458.

It will be understood that various changes in the details, materials, arrangement of parts and operating conditions which have been herein described and illustrated in order to explain the nature of the invention may be made by those skilled in the art without departing from the principles and scope of the instant invention.

What is claimed is:

1. A network interface apparatus for connecting at least one incoming coaxial transmission line with at least one subscriber coaxial transmission line comprising:

(a) a housing;

(b) apparatus mounted in the housing for connecting the incoming and subscriber coaxial transmission lines; and (c) a coaxial transmission line surge arrestor connected in series between the incoming and subscriber coaxial transmission lines, the coaxial transmission line surge arrestor comprising a gas discharge tube, the gas discharge tube comprising (1) a hollow conductive housing, (2) insulating ends adapted to seal the housing, (3) an inert gas sealed in the housing, (4) a center conductor extending through the housing, the conductor having a longitudinal axis oriented in a direction parallel to the direction of signal transmission, and (5) the diameter of the center conductor being varied along at least a portion of its length between the insulating ends for matching the impedance of the surge arrestor to that of the transmission lines.

2. The network interface apparatus of claim 1 wherein the apparatus for connecting the incoming and subscriber coaxial transmission lines includes a bulkhead connection and/or a splitter for splitting the incoming line into at least two subscriber lines.

3. The network interface apparatus of claim 1 wherein at least one of the insulating ends has striping to further facilitate reliable operation of the gas discharge tube.

4. The network interface apparatus of claim 1 wherein the exterior surface of the center conductor and the interior surface of the hollow housing are symmetrical around the longitudinal axis of the center conductor.

5. The network interface apparatus of claim 1 wherein the apparatus for connecting the incoming and subscriber coaxial transmission lines comprises two coaxial connectors that are axially aligned with each other.

6. The network interface apparatus of claim 1 wherein the apparatus for connecting the incoming and subscriber coaxial transmission lines comprises a printed circuit board on which are mounted two coaxial connectors and the gas discharge tube.

7. The network interface apparatus of claim 1 wherein the inert gas comprises a mixture of neon and argon.

8. The network interface apparatus of claim 1 further including apparatus mounted in the housing for connecting a telephone company line to a subscriber telephone line.

9. The network interface apparatus of claim 8 further including a surge arrestor mounted in the housing for connection to the telephone company and subscriber lines for providing overvoltage protection for the telephone lines.

10. The network interface apparatus of claim 1 wherein at least a portion of the interior surface of the hollow conductive housing and at least a portion of the exterior surface of the center conductor are roughened for concentrating electric fields and facilitating reliable operation of the gas discharge tube.

11. The network interface apparatus of claim 10 wherein the surface roughening takes the form of threads or serrations.

12. The network interface apparatus of claim 1 wherein the interior of the hollow housing is divided into an active discharge region and an impedance matching region and the relative proportions of the regions are chosen for matching the impedance of the surge arrestor to that of the transmission lines.

13. The network interface apparatus of claim 12 wherein the axial length of the impedance matching region is greater than the axial length of the active discharge region.

14. The network interface apparatus of claim 12 wherein the ratio of the impedance matching region to the gas discharge region is on the order of one to one.

15. The network interface apparatus of claim 12 wherein the ratio of the impedance matching region to the gas discharge region is on the order of two to one.

16. The network interface apparatus of claim 1 wherein the insulating ends are formed from a ceramic material.

17. The network interface apparatus of claim 16 wherein the portions of the ceramic insulating ends that contact the hollow conductive housing are metallized.

18. The network interface apparatus of claim 17 wherein the portions of the ceramic insulating ends that contact the center conductor are also metallized.

19. The network interface apparatus of claim 18 wherein the portions of the ceramic insulating ends that are metallized are raised relative to the unmetallized portions of the ceramic ends.

20. The network interface apparatus of claim 1 further including a fail short device connected to the gas discharge tube which normally electrically insulates the center conductor from the conductive housing, but which electrically connects the hollow conductive housing and the center conductor when the gas discharge tube overheats.

21. The network interface apparatus of claim 20 wherein the fail short device comprises a fail short conductor located between the center conductor and the conductive housing and a thermally sensitive insulator interposed between the fail short conductor and the center conductor or between the fail short conductor and the conductive housing, or both.

22. The network interface apparatus of claim 21 wherein the fail short conductor is arcuate and is mounted in an annular recess in the conductive housing external to the sealed region containing the inert gas.

23. The network interface apparatus of claim 20 wherein the gas discharge tube further includes a backup air gap which permits an electrical discharge to occur between the center conductor and the conductive housing in the event of an overvoltage condition if the tube has vented.

24. The network interface device of claim 23 wherein the backup air gap comprises a perforated insulating material.

25. The network interface device of claim 24 wherein the perforated insulating material is thermally sensitive.

26. The network interface apparatus of claim 1 wherein the gas discharge tube further includes a backup air gap which permits an electrical discharge to occur between the center conductor and the conductive housing in the event of an overvoltage condition if the tube has vented.

27. The network interface apparatus of claim 26 wherein the backup air gap comprises a perforated insulating material covering at least a portion of the center conductor and a conductor located between the conductive housing and the perforated insulating material.

28. The network interface apparatus of claim 26 wherein the backup air gap comprises a perforated insulating material covering at least a portion of the conductive housing and a conductor located between the perforated insulating material and the center conductor.

29. The network interface apparatus of claims 27 or 28 wherein the perforated insulating material is a thermally sensitive material.

30. A network interface apparatus for connecting an incoming coaxial transmission line with a subscriber coaxial transmission line comprising:

(a) a housing;

(b) apparatus mounted in the housing for connecting the incoming and subscriber coaxial transmission lines; and (c) a coaxial transmission line surge arrestor connected in series between the incoming and subscriber coaxial transmission lines, the coaxial transmission line surge arrestor comprising a gas discharge tube, the gas discharge tube comprising (1) a hollow conductive housing, (2) insulating ends adapted to seal the housing, (3) an inert gas sealed in the housing, (4) a center conductor extending through the housing, the center conductor having a longitudinal axis oriented in a direction parallel to the direction of signal transmission, the interior surface of the hollow housing and the exterior surface of the center conductor being symmetric with respect to the longitudinal axis, and (5) the ratio of the inner diameter D of the conductive housing to the outer diameter d of the center conductor being varied along at least a portion of the center conductor between the insulating ends for matching the impedance of the surge arrestor to the impedance of the transmission lines.

31. The network interface apparatus of claim 30 wherein the ratio D/d varies by a factor of at least two to one.

32. The network interface apparatus of claim 30 wherein the ratio D/d varies by a factor of at least three to one.

33. The network interface apparatus of claim 30 wherein the ratio D/d varies by a factor of at least four to one.

34. The network interface apparatus of claim 30 wherein the ratio D/d varies by a factor of at least five to one.

35. The network interface apparatus of any of claims 30 through 34 wherein the apparatus for connecting the incoming and subscriber coaxial transmission lines includes a bulkhead connection and/or a splitter for splitting the incoming line into at least two subscriber lines.

36. The network interface apparatus of any of claims 30 through 34 further including apparatus mounted in the housing for connecting a telephone company line and a subscriber line.

37. The network interface apparatus of claim 35 further including an overvoltage protection device mounted in the housing for connection to the telephone company and subscriber lines for protecting the lines in the event of an overvoltage condition.

38. The network interface apparatus of any of claims 30 through 34 wherein at least a portion of the interior surface of the hollow housing and at least a portion of the exterior surface of the center conductor are toughened for concentrating electric fields and facilitating reliable operation of the gas discharge tube.

39. The network interface apparatus of claim 38 wherein at least one of the insulating ends has striping to further facilitate reliable operation of the gas discharge tube.

40. The network interface apparatus of claim 38 wherein the insulating ends are formed from a ceramic material which is metallized in the regions where the insulating ends contact the center conductor and the conductive housing.

41. The network interface apparatus of claim 38 wherein the interior of the hollow housing is divided into an active discharge region and an impedance matching region and the relative proportions of the regions are chosen for matching the impedance of the gas discharge tube to that of the coaxial transmission lines.

42. The network interface apparatus of claim 38 wherein the apparatus for connecting the incoming and subscriber coaxial transmission lines comprises at least two coaxial connectors and the coaxial transmission line surge arrestor is connected in series between the two coaxial connectors.

43. The network interface apparatus of any of claims 30 through 34 wherein the gas discharge tube includes a fail short device which normally electrically insulates the center conductor from the conductive housing, but which electrically connects the center conductor and the conductive housing when the gas discharge tube overheats.

44. The network interface device of claim 43 wherein the gas discharge tube further includes a backup air gap which permits an electrical discharge to occur between the center conductor and the conductive housing in the event of an overvoltage condition if the tube has vented.

45. The network interface device of claim 44 wherein the fail short device comprises a thermally sensitive insulator covering at least a portion of the center conductor and a conductor located between the conductive housing and the insulator and wherein the backup air gap comprises perforations in the insulator.

46. The network interface device of claim 44 wherein the fail short device comprises a thermally sensitive insulator covering at least a portion of the conductive housing and a conductor located between the center conductor and the insulator and wherein the backup air gap comprises perforations in the insulator.

47. A network interface apparatus for connecting an incoming coaxial transmission line with a subscriber coaxial transmission line and for connecting a telephone company line with a subscriber telephone line, the apparatus comprising:

(a) a housing;

(b) apparatus mounted in the housing for connecting the telephone company and subscriber telephone lines;

(c) apparatus mounted in the housing for connecting the incoming and subscriber coaxial transmission lines; and (d) a coaxial transmission line surge arrestor connected in series between the incoming and subscriber coaxial transmission lines, the coaxial transmission line surge arrestor comprising a gas discharge tube, the gas discharge tube comprising (1) a hollow conductive housing, (2) insulating ends for sealing the housing, (3) an inert gas sealed in the housing, (4) a center conductor extending through the housing, the center conductor having a longitudinal axis which is oriented in a direction parallel to the direction of signal transmission, the interior surface of the hollow housing and the exterior surface of the center conductor being symmetric with respect to the longitudinal axis, and (5) the ratio of the inner diameter D of the conductive housing to the outer diameter d of the center conductor being varied along at least a portion of the length of the center conductor between the insulating ends for matching the impedance of the gas discharge tube to the impedance of the transmission lines.

48. The network interface apparatus of claim 47 further including an overvoltage protection device mounted in the housing for connection to the telephone company and subscriber telephone lines for protecting the lines in the event of an overvoltage condition.

49. The network interface apparatus of claim 47 wherein the ratio D/d varies by a factor of at least four to one.

50. The network interface apparatus of claim 47 further including current limiting protection in the form of an inductance connected in series between the center conductors of the incoming and subscriber coaxial transmission lines.

51. The network interface apparatus of claim 47 wherein the interior of the conductive housing is divided into an active discharge region and an impedance matching region and the relative proportions of the regions are chosen for matching the impedance of the gas discharge tube to the impedance of the coaxial transmission lines.

52. The network interface apparatus of claim 47 wherein the coaxial transmission line surge arrestor includes a fail short device which normally electrically insulates the center conductor from the conductive housing but which electrically connects the center conductor to the conductive housing in the event the surge arrestor overheats.

53. The network interface apparatus of claim 52 wherein the fail short device comprises a fail short conductor located between the center conductor and the conductive housing and a thermally sensitive insulating material interposed between the fail short conductor and the center conductor or between the fail short conductor and the conductive housing, or both.

54. The network interface apparatus of claim 52 wherein the gas discharge tube further includes a backup air gap which permits an electrical discharge to occur between the center conductor and the conductive housing in the event of an overvoltage condition.

55. The network interface device according to claim 54 wherein the fail short device comprises a fail short conductor located between the center conductor and the conductive housing and a thermally sensitive insulating material interposed between the fail short conductor and the center conductor or between the fail short conductor and the housing, or both, and the backup air gap comprises perforations in the insulating material.

56. A gas discharge tube suitable for use in a coaxial transmission line surge arrestor, the gas discharge tube comprising:

(a) a hollow conductive housing;

(b) insulating ends adapted to seal the housing;

(c) an inert gas sealed in the housing;

(d) a center conductor extending through the housing, the conductor having a longitudinal axis oriented in a direction parallel to the direction of signal transmission; and (e) a fail short device mounted external to the region containing the inert gas and which normally electrically insulates the center conductor from the conductive housing, but which electrically connects the center conductor and the conductive housing when the gas discharge tube overheats, the fail short device comprising a fail short conductor located between the conductive housing and the center conductor and a thermally sensitive insulator interposed between the fail short conductor and the center conductor or between the fail short conductor and the conductive housing, or both, the fail short conductor being arcuate and being mounted in an annular recess in the conductive housing located external to the region containing the inert gas.

57. The gas discharge tube of claim 56, further including a backup air gap which permits an electrical discharge to occur between the center conductor and the conductive housing in the event of an overvoltage condition.

58. The gas discharge tube of claim 56 further including a backup air gap comprising perforations in the thermally sensitive insulator.

59. The gas discharge tube of claim 56, wherein at least a portion of the interior surface of the hollow conductive housing and at least a portion of the exterior surface of the center conductor are roughened for concentrating electric fields and facilitating reliable operation of the gas discharge tube.

60. The gas discharge tube of claim 59 wherein the surface roughening takes the form of threads or serrations.

61. The gas discharge tube of claim 59 wherein at least one of the insulating ends has striping to further facilitate reliable operation of the gas discharge tube.

62. The gas discharge tube claim 56, wherein the insulating ends are formed from a ceramic material.

63. The gas discharge tube of claim 62 wherein the portions of the ceramic insulating ends that contact the hollow conductive housing are metallized.

64. The gas discharge tube of claim 63 wherein the portions of the ceramic insulating ends that contact the center conductor are also metallized.

65. The gas discharge tube of claim 64 wherein the portions of the ceramic insulating ends that are metallized are raised relative to the unmetallized portions of the ceramic ends.

66. The gas discharge tube of claim 56, wherein the exterior surface of the center conductor and the interior surface of the hollow housing are symmetrical around the longitudinal axis of the center conductor and the ratio of the inner diameter D of the conductive housing to the outer diameter d of the center conductor is varied along at least a portion of the center conductor between the insulating ends to control the impedance of the gas discharge tube.

67. The network interface apparatus of claim 66 wherein the ratio D/d varies by at least two to one.

68. The network interface apparatus of claim 66 wherein the ratio D/d varies by at least three to one.

69. The network interface apparatus of claim 66 wherein the ratio D/d varies by at least four to one.

70. The network interface apparatus of claim 66 wherein the ratio D/d varies by at least five to one.

71. The gas discharge tube of claim 56, wherein the interior of the hollow housing is divided into an active discharge region and an impedance matching region and the relative proportions of the regions are chosen to control the impedance of the gas discharge tube.

72. The gas discharge tube of claim 71 wherein the axial length of the impedance matching region is greater than the axial length of the active discharge region.

73. The gas discharge tube of claim 71 wherein the ratio of the impedance matching region to the gas discharge region is on the order of one to one.

74. The gas discharge tube of claim 71 wherein the ratio of the impedance matching region to the gas discharge region is on the order of two to one.

75. A coaxial transmission line surge arrestor comprising:

(f) a gas discharge tube comprising (1) a hollow conductive housing, (2) insulating ends adapted to seal the housing, (3) an inert gas sealed in the housing, and (4) a center conductor extending through the housing, the conductor having a longitudinal axis oriented in a direction parallel to the direction of signal transmission;

(b) a conductive sleeve surrounding the gas discharge tube, the sleeve being in electrical contact with the conductive housing; and (c) a fail short device located within the conductive sleeve which normally electrically insulates the center conductor and the conductive sleeve, but which electrically connects the center conductor and the conductive sleeve when the gas discharge tube overheats, the fail short device being arcuate and being mounted within an annular recess in the conductive sleeve.

76. The surge arrestor of claim 75 wherein the fail short device comprises a fail short conductor located between the center conductor and the conductive housing and a thermally sensitive insulator interposed between the fail short conductor and the center conductor or between the fail short conductor and the conductive housing, or both.

77. The surge arrestor of claim 76 wherein the gas discharge tube further includes a backup air gap comprising perforations in the thermally sensitive insulator.

78. The surge arrestor of claim 76 further including at least one coaxial connector mounted to the conductive sleeve, the center conductor of the coaxial connector being connected to the center conductor of the gas discharge tube.

79. The surge arrestor of any of claims 75, or 76 or 78 wherein the gas discharge tube further includes a backup air gap which permits an electrical discharge to occur between the center conductor and the conductive housing in the event of an overvoltage condition.

80. The surge arrestor of any claims 75, or 76 or 78 wherein at least a portion of the interior surface of the hollow conductive housing and at least a portion of the exterior surface of the center conductor are roughened for concentrating electric fields and facilitating reliable operation of the gas discharge tube.

81. The surge arrestor of claim 80 wherein the surface roughening takes the form of threads or serrations.

82. The surge arrestor of claim 80 wherein at least one of the insulating ends has striping to further facilitate reliable operation of the gas discharge tube.

83. The surge arrestor of any of claims 75, or 76 or 78 wherein the insulating ends are formed from a ceramic material.

84. The surge arrestor of claim 83 wherein the portions of the ceramic insulating ends that contact the hollow conductive housing are metallized.

85. The surge arrestor of claim 84 wherein the portions of the ceramic insulating ends that contact the center conductor are also metallized.

86. The surge arrestor of claim 85 wherein the portions of the ceramic insulating ends that are metallized are raised relative to the unmetallized portions of the ceramic ends.

87. The surge arrestor of any of claims 75, or 76 or 78 wherein the exterior surface of the center conductor and the interior surface of the hollow housing are symmetrical around the longitudinal axis of the center conductor and the ratio of the inner diameter D of the conductive housing to the outer diameter d of the center conductor is varied along at least a portion of the center conductor between the insulating ends to control the impedance of the gas discharge tube.

88. The surge arrestor of claim 87 wherein the ratio D/d varies by at least two to one.

89. The surge arrestor of claim 87 wherein the ratio D/d varies by at least three to one.

90. The surge arrestor of claim 87 wherein the ratio D/d varies by at least four to one.

91. The surge arrestor of claim 87 wherein the ratio D/d varies by at least five to one.

92. The surge arrestor of any of claims 75, or 76, or 78 wherein the interior of the hollow housing is divided into an active discharge region and an impedance matching region and the relative proportions of the regions are chosen to control the impedance of the gas discharge tube.

93. The surge arrestor of claim 92 wherein the axial length of the impedance matching region is greater than the axial length of the active discharge region.

94. The surge arrestor of claim 92 wherein the ratio of the impedance matching region to the gas discharge region is on the order of one to one.

95. The surge arrestor of claim 92 wherein the ratio of the impedance matching region to the gas discharge region is on the order of two to one.

* * * * *